(12) United States Patent
Kaneko et al.

(10) Patent No.: US 6,509,116 B1
(45) Date of Patent: Jan. 21, 2003

(54) SECONDARY BATTERY AND CAPACITOR USING INDOLE POLYMERIC COMPOUND

(75) Inventors: Shinako Kaneko, Tokyo (JP); Toshihiko Nishiyama, Tokyo (JP); Masaki Fujiwara, Tokyo (JP); Gaku Harada, Tokyo (JP); Masato Kurosaki, Tokyo (JP)

(73) Assignee: NEC Tokin Corporation, Miyagi (JP)

( * ) Notice: Subject to any disclaimer, the term of this patent is extended or adjusted under 35 U.S.C. 154(b) by 42 days.

(21) Appl. No.: 09/619,708

(22) Filed: Jul. 19, 2000

(30) Foreign Application Priority Data

Jul. 22, 1999 (JP) ............................................. 11-207499

(51) Int. Cl.[7] ................................................ H01M 4/60
(52) U.S. Cl. ..................................... 429/213; 429/218.1
(58) Field of Search ................................. 429/213, 218.1

(56) References Cited

PUBLICATIONS

Talbi et al., "Electrochemical properties of polyindole and poly(5–cyanoindole) in LiClO4–acetonitrile and in HCL and HCLO4 solutions," Synthetic Metals, 93, 105–110 (1998).*
Kokkinidis et al. "Electrochemical behavior of nitroindoles: oxidative electropolymerization and reduction of the nitro group of polymerized and non–polymerized 4–nitro and 5–nitroindole," Journal of Electroanalytical Chemistry, 414(2), 197–208 (1996).*
Mackintosh et al. "Determination of the structure of electropolymerized indole–5–carboxylic acid," J. Electroanalytical Chemistry, 375(1–2), 163–168 (1994).*

* cited by examiner

Primary Examiner—Carol Chaney
Assistant Examiner—Dah-Wei D. Yuan
(74) Attorney, Agent, or Firm—Sughrue Mion, PLLC

(57) ABSTRACT

Secondary batteries and capacitors have a high electromotive force together with a high cyclic property and are capable of fast charging and discharging, using a polymeric compound having a high stability and high reactivity in an acidic ambient, as an electrode active material. The secondary batteries and capacitors include an indole polymeric compound as an electrode active material. The polymeric compound uses a proton as a charge carrier and has a constituent represented by general formula (1):

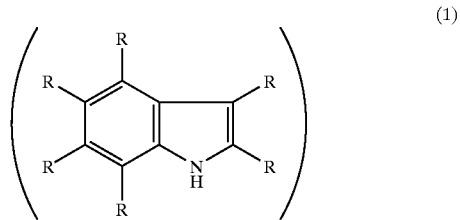

wherein each R denotes a hydrogen atom, a halogen atom, a hydroxyl group, a carboxyl group, a sulfonic group, a sulfuric acid group, a nitro group, a cyano group, an alkyl group, an aryl group, an alkoxyl group, an amino group, an alkylthio group and an arylthio group, which may be the same or different from each other, and at least one R is a substituent other than a hydrogen atom.

38 Claims, 4 Drawing Sheets

SECONDARY BATTERY AND CAPACITOR USING INDOLE POLYMERIC COMPOUND

BACKGROUND OF THE INVENTION

1. Field of the Invention

The present invention relates to a secondary battery and capacitor, and more particularly to a secondary battery and capacitor in which an indole polymeric compound is used as an electrode active material and a proton is employed as a charge carrier thereof.

2. Description of the Related Art

As an invention that employs indole, JP 5-148320A discloses a method of chemical-oxidative polymerization of indole monomers to obtain polyindole, and a conductive device that contains polymers polymerized through the method. The indole is limited only to the polyindole and the use of the conductive device is only for conductive films and electrochromic devices.

A paper on "Electrochemical synthesis of polyindole and its evaluation for rechargeable battery applications" describes a battery composed of $Zn/ZnSO_4$/Polyindole. This battery employs a neutral electrolytic solution. The reaction of the battery in the neutral electrolytic solution is accompanied with doping and de-doping of dopant anions. These dopant anions are large in size and low in mobility. Accordingly, this battery is disadvantageous to performances of fast charging and discharging.

SUMMARY OF THE INVENTION

An object of the present invention is to provide a secondary battery and capacitor having a high electromotive force together with a high cyclic property land being capable of fast charging and discharging, using a polymeric compound having a high stability and high reactivity in an acidic ambient, as an electrode active material.

In accordance with the present invention, a secondary battery and capacitor are provided, which include an indole polymeric compound as an electrode active material. The polymeric compound employs a proton as a charge carrier and has a constituent represented by general formula (1):

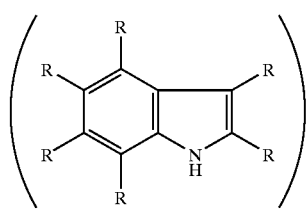

(1)

In the general formula, each R denotes a hydrogen atom, a halogen atom, a hydroxyl group, a carboxyl group, a sulfonic group, a sulfuric acid group, a nitro group, a cyano group, an alkyl group, an aryl group, an alkoxyl group, an amino group, an alkylthio group and an arylthio group. R's may be the same or different from each other. At least one R has a substituent other than a hydrogen atom. At least two R's, are employed for bonding to form a polymer. These bonds may be double bonds.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE INVENTION

Embodiments of the invention will be described below in detail.

Figure 1:
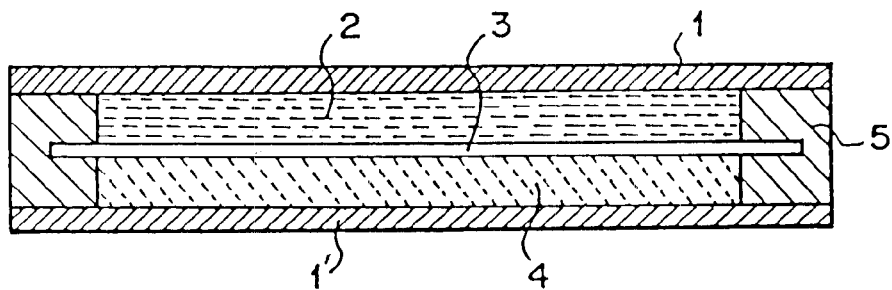
FIG. 1 is a cross sectional view of a secondary battery or capacitor of the present invention.

FIG. 1 shows a structure of a secondary battery or capacitor of the present invention. This secondary battery or capacitor comprises an anode material 2 formed on a collector 1 and a cathode material 4 formed on a collector 1', respectively. The anode material 2 is an indole polymeric compound. The cathode material 4 comprises an n-doped polymeric compound that can store charges through the reaction accompanied with absorption and desorption of protons, such as a quinoxaline polymeric compound or another polymeric compound reacting through absorption and desorption of protons. These polymeric compound electrodes and electrodes that are active in the presence of protons are formed on collectors 1, 1', respectively. The anode material 2 and the cathode material 4 are arranged opposing to each other, interposing therebetween a separator 3 that contains an electrolytic solution impregnated therein, or a gel electrolyte or solid electrolyte, in which the electrolytic solution contains protons. Any cathode material is available so long as it is active in the presence of protons.

The indole polymeric compound used for the anode material can be produced through an electrochemical or chemical method. The starting substance for synthesizing the indole polymeric compound of the anode material is an organic compound that can be used to form a polymeric compound having an indole skeleton through an electrical or chemical method such as electrolytic polymerization, chemical polymerization, condensation reaction and substitution reaction.

The indole polymeric compound of the anode material can be doped through an electrochemical or chemical method. Each X in the following reaction formulae (1) and (2) represents a dopant ion.

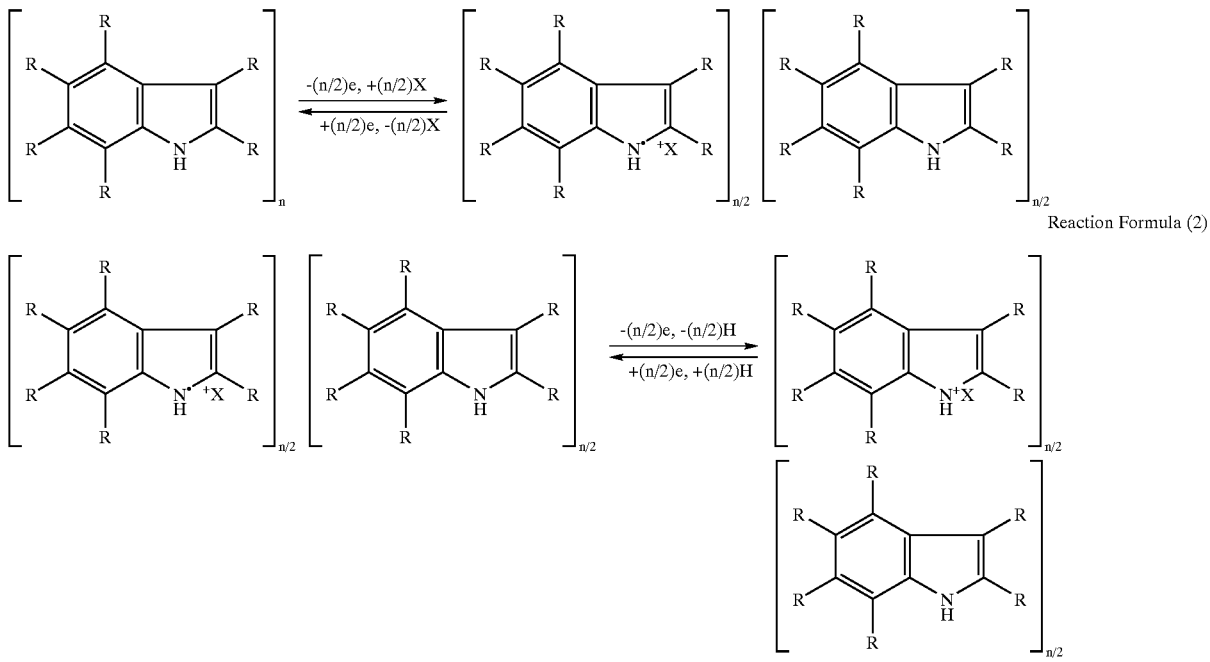

Reaction Formula (1)

Reaction Formula (2)

In the reaction formulae (1) and (2), each X exemplifies a halide ion, perchloric acid ion, tetrafluoroboric acid ion, sulfuric acid ion, alkylsulfonic acid ion, alkylsulfuric acid ion, trifluoromethanesulfonic acid ion and trifluoroacetic acid ion but any of the ions is available so long as it can be doped into the indole polymeric compound.

A conductive auxiliary may be added, if necessary, to ensure the conductivity of the indole polymeric compound electrode. The conductive auxiliary includes materials that can ensure the conductivity, for example, carbon black, crystalline carbon and amorphous carbon. An organic binder is also employed, if required, to secure these materials on the collector.

Although a mixing ratio of the above-mentioned constituents is arbitrary, in consideration of efficiency per unit weight or unit volume, preferably the indole polymeric compound is in a range of 30–95% by weight; the conductive auxiliary, 0–50% by weight; and the organic binder, 0–20% by weight. More preferably, the indole polymeric compound is in a range of 60–90% by weight. If the indole polymeric compound is less than 30% by weight, the reaction efficiency per unit volume easily lowers. If it exceeds 95% by weight, it becomes undesirably difficult to ensure the conductivity of the electrode.

The electrolytic solution is an aqueous or nonaqueous solution that contains protons preferably $10^{-3}$ mol/l to 18 mol/l, and more preferably $10^{-1}$ mol/l to 7 mol/l. If the content of protons is less than 10-3 mol/l, the low proton concentration reduces the reactivity of the electrode material. If the content of protons is more than 18 mol/l, the strong acidity reduces the activity of the material or solves the material. An alkaline metallic salt, an alkaline earth metallic salt, an organic sulfonate, a sulfate, a nitrate and a perchlorate can be added, if necessary, to the proton-containing electrolytic solution. In the aqueous or nonaqueous solution, such salts that can ensure the ionic conductivity are preferred. These salts are not limited both in type and in concentration.

Figure 2:
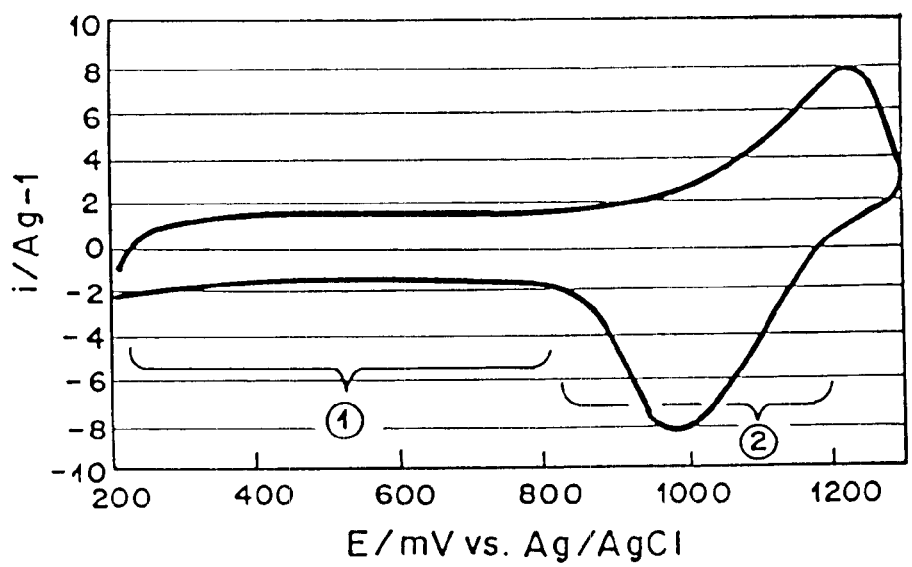
FIG. 2 is a cyclic voltamogram in an acidic aqueous solution of an indole polymeric compound.

The indole polymeric compound of the anode material has two reaction steps in the proton-containing electrolytic solution {the reaction formulae (1) and (2)}. FIG. 2 shows a typical cyclic voltamogram (hereinafter referred to as CV) in an acidic aqueous solution of the indole polymeric compound.

The reaction of the reaction formula (1) accompanied with doping and de-doping dopants occurs within a region ① (in the vicinity of nearly 0–800 mV vs. Ag/AgCl). The reaction of the reaction formula (2) accompanied with absorption and desorption of protons occurs within a region ② (in the vicinity of nearly 800–1300 mV). It has been found that the reaction of the indole polymeric compound of the reaction formula, (2) has a high reactivity and an excellent cyclic property.

The present invention provides a secondary battery and capacitor that has an excellent cyclic property and employs the reaction formula (2) in the proton-containing electrolytic solution (the reaction accompanied with absorption and desorption of protons) as the reaction of charge and discharge.

Charge and discharge tests were performed to evaluate the characteristics of the secondary battery and capacitor of the present invention. The charge and discharge were performed at charge and discharge current densities of 1,10 and 100 $mA/cm^2$ per unit electrode-opposing area of each battery. A capacity from a discharge starting voltage (electromotive force) to 80% voltage thereof is defined as a discharge capacity, which is represented using a capacity per active substance of the anode material. A charge and discharge cycle test was performed at a charge and discharge current density of 10 $mA/cm^2$, 60% discharge depth and 25° C. to compare characteristics of examples and comparative examples by their cycle number until the capacity reduces to 80% of the initial capacity.

The indole polymeric compound has a higher redox potential compared to a typical conductive polymeric compound of proton-conductive type such as polyaniline and a polymeric compound of quinone type such as polydiaminoanthraquinone. For example, in the acidic aqueous solution, polyaniline has a reaction accompanied with absorption and desorption of protons at 250 mV vs. Ag/AgCl, and polydiaminoanthraquinone has a reaction accompanied with absorption and desorption of protons at 650 mV vs. Ag/AgCl. In contrast, the indole polymeric compound has a reaction accompanied with, absorption and desorption of protons at 800–1300 mV vs. Ag/AlgCl in the acidic aqueous solution. Therefore, it can increase its electromotive force by 1000 mV at most relative to the battery or capacitor that employs the polymeric compound such as polyaniline and polydiaminoanthraquinone. Accordingly, a battery and capacitor with a high electromotive force can be obtained.

The indole polymeric compound has the reaction accompanied with doping and de-doping anions at the lower potential side {reaction formula (1)} along with the reaction by absorption and desorption of protons at the higher potential side {reaction formula (2)}. The present invention employs the reaction of reaction formula (2) at the higher potential side, excellent in cyclic property, as the reaction of the secondary battery and capacitor to obtain an excellent cyclic property, while maintaining a high electromotive force.

In the reaction formula (2) of the indole polymeric compound, the reaction is accompanied only with the movement of a proton having a small ionic size. The present invention employs the reaction that is accompanied with the movement of a proton having the smallest ionic size and a larger mobility. Therefore, it is possible to obtain a secondary battery and capacitor capable of rapid charging and discharging.

Specific Examples of the present invention will be detailed below with non-limitative constitutions such as materials and battery arrangements herein exemplified.

EXAMPLE 1

A secondary battery was produced through the following procedures, using poly(6-nitroindole) represented by the following structural formula (2) as the anode material 2; polyphenylquinoxaline represented by the following structural formula (3) as the cathode material 4; and 40% sulfuric acid (5.3 mol/l ) as the electrolytic solution.

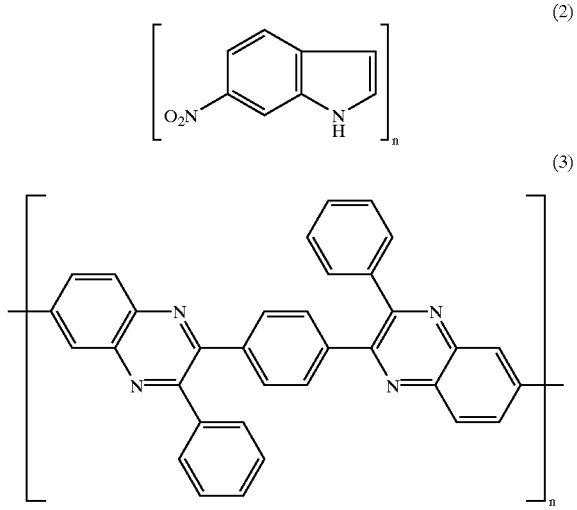

Poly(6-nitroindole) was mixed with crystalline carbon as the conductive auxiliary at a weight ratio of 75:25, followed by addition of dimethylformamide to solve poly(6-nitroindole), and drying at 120° C. Then, the mixture was pulverized, followed by addition of the electrolytic solution of 40% sulfuric acid (5.3 mol/l) to produce an electrode paste. This paste was coated over a collector 1 with a 500 μm thick gasket 5 to obtain an electrode of the anode material 2.

As for production of an electrode of the cathode material 4, polyphenylquinoxaline was mixed with Ketjenblack as the conductive auxiliary at a weight ratio of 75:25, followed by addition of 40% sulfuric acid (5.3 mol/l) to produce an electrode paste. This paste was coated over a collector 1' with a gasket 5 similar to the anode.

Each electrode was pressed at a pressure of 1370 kPa (14 kgf/cm$^2$) to remove extra sulfuric acid. Thereafter, a separator 3, containing 40% sulfuric acid (5.3 mol/l) impregnated therein, was sandwiched between the anode material 2 and the cathode material 4 to produce a secondary battery as shown in FIG. 1.

Poly(6-nitroindole), used for the anode material of this example, was in a state that sulfuric acid ions were doped into it in the aqueous solution of 40% sulfuric acid, and the redox reaction accompanied with absorption and desorption of protons, corresponding to the reaction formula (2), proceeded at about 900–1200 mV vs. Ag/AgCl. As for polyphenylquinoxaline in the same solution, the redox reaction proceeded at about −100 to 100 mV vs. Ag/AgCl. Accordingly, for the secondary battery, constant current charge and discharge tests were performed at 1–100 mA/cm$^2$ with an electromotive force of 1.2 V.

Figure 3:
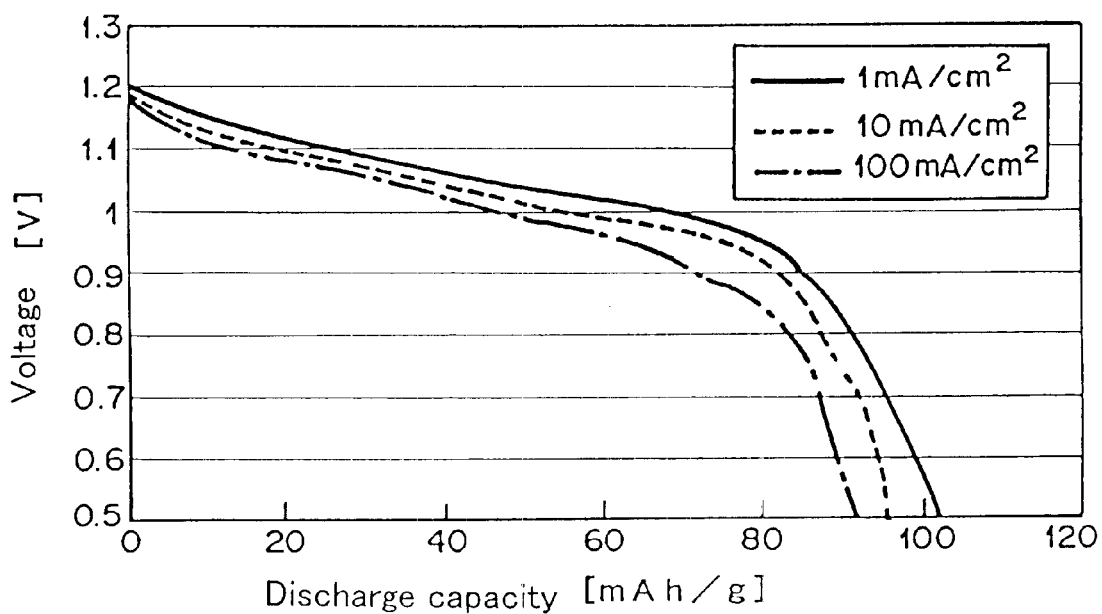
FIG. 3 shows discharge curves of a secondary battery according to Example 1.

The results from the secondary battery are shown in Table 1, and the discharge curve is shown in FIG. 3. The secondary battery of Example 1 achieved 79–65 mAh/g at charge and discharge current densities of 1–100 mA/cm$^2$. As the theoretical capacity of poly(6-nitroindole) is 84 mAh/g, its capacity occurrence rate was 94% at the charge and discharge current density of 1 mA/cm$^2$ with a very high reaction rate. In addition, a discharge capacity at a charge and discharge current density of 100 mA/cm$^2$ maintains 82% of capacity relative to that at 1 mA/cm$^2$. This indicates that this secondary battery is excellent in fast charge and discharge properties.

Table 1 shows a cyclic property, at a charge and discharge current density of 10 mA/cm$^2$, 25° C. and 60% discharge depth. The secondary battery had a cycle number of 24,000 from the initial capacity to 80% thereof, and exhibited a very excellent cyclic property.

The secondary battery had an electromotive force of 1.2 V, which improved by 0.8 V compared to a secondary battery of Comparative Example 1, and also had an excellent cyclic property. In fast charge and discharge at 100 mA/cm$^2$, the capacity reduction rate was 82%, which was very small, compared to that at 1 mA/Cm$^2$. This indicates that this secondary battery is excellent in fast charge and discharge properties.

TABLE 1

| | Electrolytic solution | Dopant | Ions involved in reactions of anode | Voltage (V) | Capacity (mAh/g) | | | Cyclic property (cycles) |
| | | | | | Charge and discharge current density 1 mA/cm² | Charge and discharge current density 10 mA/cm² | Charge and discharge current density 100 mA/cm² | |
|---|---|---|---|---|---|---|---|---|
| Example 1 | Aqueous solution | $SO_4^{2-}$ | $H^+$ | 1.2 | 79 | 76 | 65 | 24,000 |
| Example 2 | Aqueous solution | $SO_4^{2-}$ | $H^+$ | 1.3 | 85 | 84 | 77 | 15,000 |
| Example 3 | PC solution | $ClO_4^-$ | $H^+$ | 2.2 | 67 | 63 | 52 | 12,000 |
| Comparative Example 1 | Aqueous solution | $SO_4^{2-}$ | $H^+$ | 0.4 | 16 | 16 | 11 | 20,000 |
| Comparative Example 2 | Aqueous solution | $SO_4^{2-}$ | $HSO_4^-$ or $SO_4^{2-}$ | 0.9 | 29 | 22 | 13 | 125 |

The content of poly(6-nitroindole) in the anode material was changed to perform another charge and discharge test at 1 mA/cm². The results are shown in Table 2.

TABLE 2

| Poly(6-nitroindole) (wt. %) | Capacity (mAh/g) | Capacity (mAh/cc) |
|---|---|---|
| 30 | 81 | 8 |
| 45 | 81 | 14 |
| 60 | 79 | 21 |
| 75 | 79 | 53 |
| 90 | 63 | 52 |
| 95 | 51 | 45 |

The sulfuric acid concentration in the electrolytic solution was changed to perform a further charge and discharge test at 1 mA/m². The results are shown in Table 3.

TABLE 3

| Sulfuric acid concentration (mol/l) | Capacity (mAh/g) |
|---|---|
| 0.001 | 51 |
| 0.01 | 57 |
| 0.1 | 88 |
| 1 | 81 |
| 3 | 79 |
| 5 | 78 |
| 7 | 65 |
| 18 | 36 |

EXAMPLE 2

A secondary battery was produced, using poly(5-cyanoindole) represented by the following structural formula 2' as the anode material; polyphenylquinoxaline as the cathode material; and an aqueous solution of 40% sulfuric acid as the electrolytic solution, through as those of Example 1.

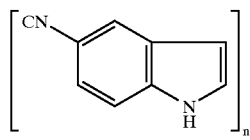

(2')

Poly(5-cyanoindole), used for the anode material was in a state that sulfuric acid ions were doped into it in the electrolytic solution, and the reaction accompanied with absorption and desorption of protons, corresponding to the reaction formula (2), proceeded about 1000–1300 mV vs. Ag/Agcl.

Accordingly, for the secondary battery, constant current charge and discharge tests were performed at 1–100 mA/cm² with an electromotive force of 1.3 V.

Figure 4:
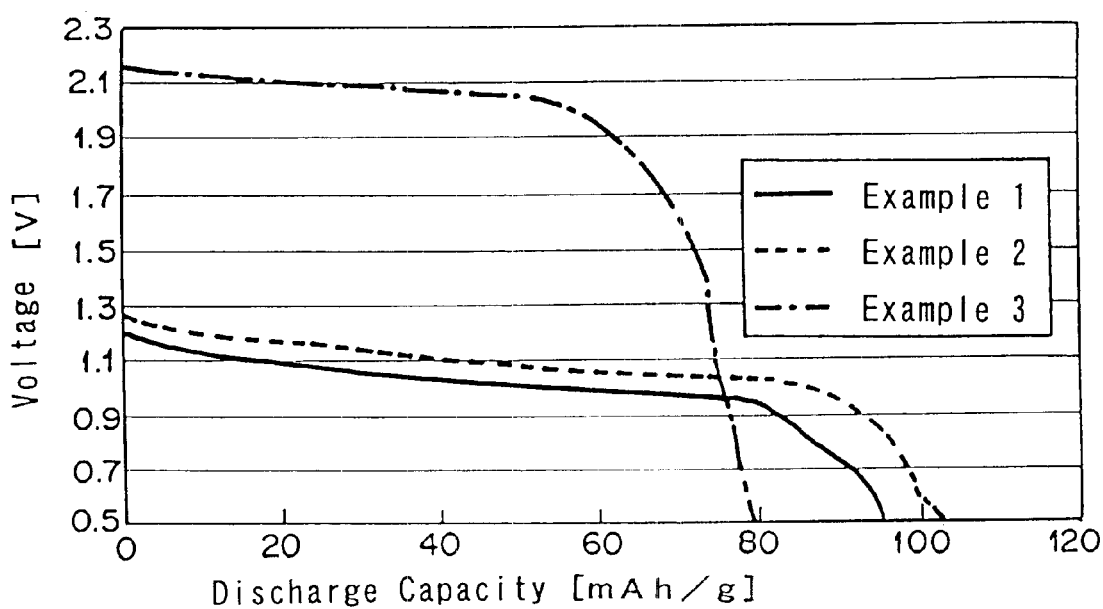
FIG. 4 shows discharge curves of secondary batteries at 10 mA/cm$^2$ according to Examples 1–3.

The results from the secondary battery are shown in Table 1 and the discharge curve is shown in FIG. 4. Discharge curves at 10 mA/cm² of Examples 1 and 3 are also shown in FIG. 4.

The discharge capacity achieved 85–77 mAh/g at charge and discharge current densities of 1–100 mA/cm². As the theoretical capacity of poly(5-cyanoindole) is 96 mAh/g, the capacity occurrence rate at a charge and discharge current density of 1 mA/cm² was 89%.

Table 1 shows a cyclic property, at a charge and discharge current density of 10 mA/cm², 25° C. and 60% discharge depth. The secondary battery had a cycle number of 15,000 from the initial capacity to 80% thereof.

The secondary battery increased by 0.1 V in electromotive force, compared to that of Example 1, and also its capacity at 1 mA/cm² improved by 7.6%. As for the discharge capacity at a charge and discharge density of 100 mA/cm², the capacity reduction rate at 1 mA/cm² was 91%, which was very small, and the secondary battery exhibited vary excellent charge and discharge properties.

EXAMPLE 3

A secondary battery was produced, using poly(6-nitroindole) as the anode material; polyphenylquinoxaline as the cathode material; and propylene carbonate (hereinafter referred to as PC) containing 1 mol/l of tetraethylammonium tetrafluoroborate and 0.1 ml/l of trifluoroacetic acid as the electrolytic solution. The PC solution was substituted for the aqueous solution of 40% sulfuric acid of Example 1 to produce the secondary battery through the same procedures as those of Example 1.

Poly(6-nitroindole), used for the anode material, was in a state that tetrafluoroboric acid ions were doped into it in the electrolytic solution, and the redox reaction accompanied with absorption and desorption of protons, corresponding to the reaction formula (2), proceeded at about 800 to 1200 mV vs. Ag/AgCl. As for polyphenylquinoxaline of the cathode material, the redox reaction proceeded at about −1100 to −900 mV vs. Ag/AgCl. Accordingly, for the secondary battery, constant current charge and discharge tests were performed at 1–100 mA/cm² with an electromotive force of 2.3 V.

The results from the secondary battery are shown in Table 1, and the discharge curves are shown in FIG. 4. Discharge curves at 10 mA/cm² of Examples 1 and 2 are also shown in FIG. 4.

The discharge capacity achieved 67–52 mAh/g at charge and discharge current densities of 1–100 mA/cm². As the theoretical capacity of poly(6-nitroindole) is 84 mAh/g, its capacity occurrence rate at a charge and discharge current density of 1 mA/cm² was 79%.

Table 1 shows a cyclic property, at a charge and discharge current density of 10 mA/cm², 25° C. and 60% discharge depth. The secondary battery had a cycle number of 112,000 from the initial capacity to 80% thereof.

A nonaqueous solution is often used to greatly shift the redox potential of the electrode material. In this example, a nonaqueous solution was used to greatly shift the redox potential of the cathode material to the lower potential side, and then the electromotive force of the battery increased.

Structures of Comparative Examples

A secondary battery was produced, using polyaniline as the anode material; polyphenylquinoxaline as the cathode material; and an aqueous solution of 40% sulfuric acid as the electrolytic solution, through the same procedures as those of Example 1.

Figure 5:
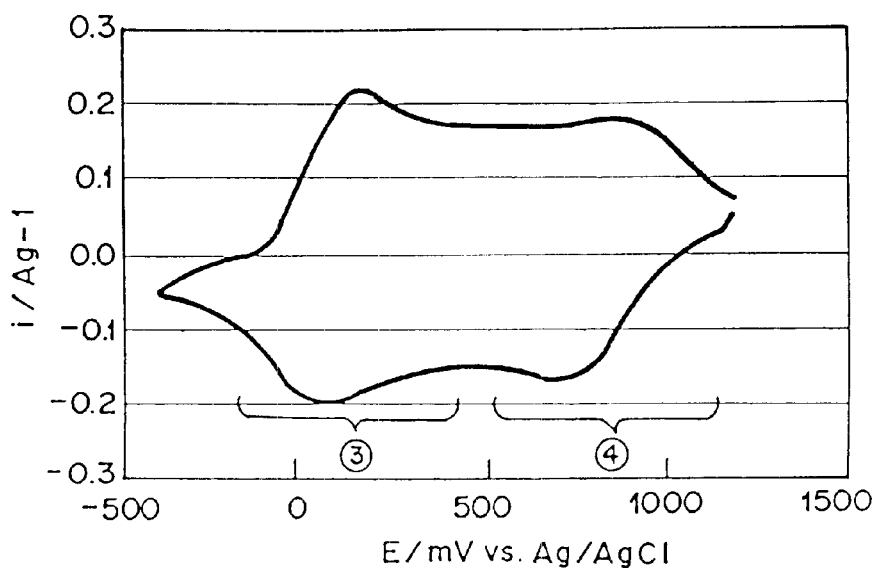
FIG. 5 is a cyclic voltamogram of polyaniline in an aqueous solution of 40% sulfuric acid.

FIG. 5 shows a CV of polyaniline in the aqueous solution of 40% sulfuric acid. As shown in FIG. 5, the reaction of polyaniline, accompanied with absorption and desorption of protons, corresponds to a reaction at the lower potential side (region ③) and the reaction at the higher potential side is a reaction accompanied with doping and de-doping of anions (region ④). Therefore, in order to realize a secondary battery with a high cyclic property, the electromotive force of the battery extremely lowers. In order to elevate the electromotive force, it is required to employ the second redox reaction, which reduces the cyclic property.

In the second battery of this comparative example, there are contrary points: (i) the electromotive force of the battery lowers while the cyclic property is ensured; and (ii) the cyclic property lowers while the electromotive force of the battery is ensured. In this regard, characteristic comparison was performed on the assumption that Comparative Example 1 exemplifies a battery accompanied with the reaction at the lower potential side (region ③) and Comparative Example 2 exemplifies a battery accompanied with the reaction at the higher potential side (region ④).

Comparative Example 1

Figure 6:
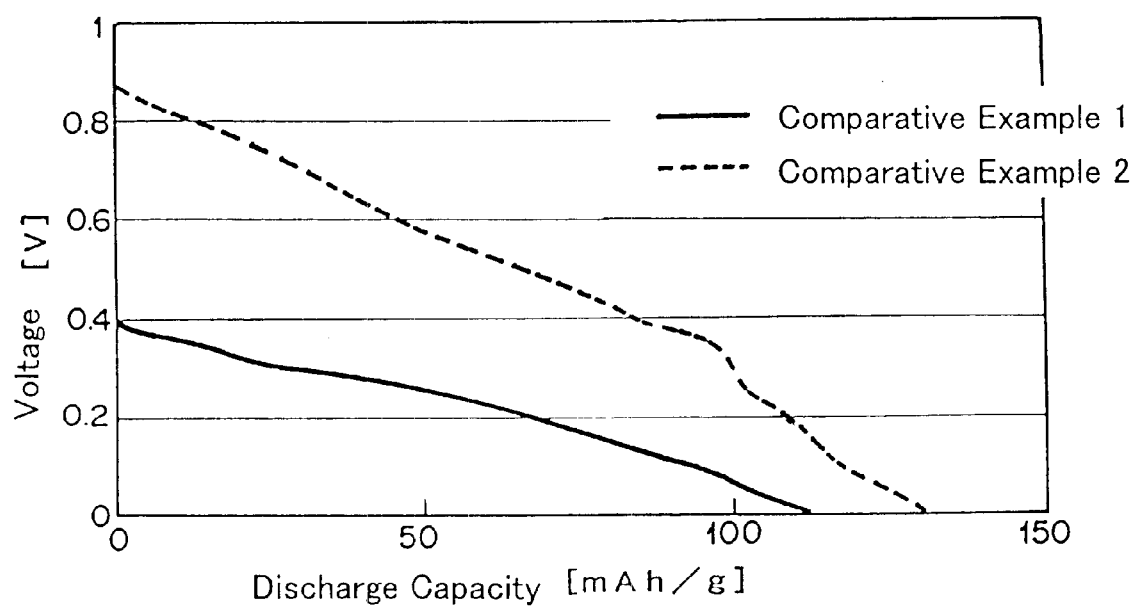
FIG. 6 shows discharge curves of secondary batteries at 10 mA/cm$^2$ according to Comparative Examples, 1 and 2.

FIG. 6 shows a discharge curve at 10 mA/cm² of Comparative Example 1. The discharge curve has no flat potential part and exhibits a behavior almost similar to a discharge curve of a capacitor. It was because the anode material had a reaction potential extremely close to that of the cathode material and potentials of both electrodes became the same before respective discharges finished. This inhibited to cause a flat part in the discharge curve.

In Comparative Example 1, the capacity (discharge capacity down to 80% of the electromotive force.) was 16 mAh/g at 1 mA/cm² with an electromotive force, 0.4 V, of the battery. Table 1 shows a cyclic property, at a charge and discharge current density of 10 mA/cm², 25° C. and 60% discharge depth. In Comparative Example 1, the cycle number until the capacity decreased to 80% of the initial capacity was 20,000.

Comparative Example 2

FIG. 6 shows a discharge curve at 10 mA/cm² of Comparative Example 2. In this comparative example, a potentially dropped part occurred. It was because the cathode almost finished discharging when the anode finished the reaction of doping and de-doping of anions (the reaction at ④ in FIG. 5).

In Comparative Example 2, the capacity (discharge capacity down to 80% electromotive force) was 29 mAh/g at 1 mA/cm² with an electromotive force, 0.9 V, of the battery. Table 1 shows a cyclic property, at a charge and discharge current density of 10 mA/cm², 25° C. and 60% discharge depth. In Comparative Example 2, the cycle number from the initial capacity to 80% thereof was 125, which was very small. It was because the reaction of polyaniline at the low cyclic property region (the reaction at ④ in FIG. 5) was employed.

EXAMPLE 4

A capacitor was produced, using poly(6-nitroindole) as the anode material 2; polyaniline as the cathode material 4; and an aqueous solution of 40% sulfuric acid as the electrolytic solution.

An electrode of the anode material 2 was produced through the same procedures as those of Example 1. An electrode of the cathode material 4 was produced by mixing polyaniline with crystalline carbon as the conductive auxiliary at a weight ratio of 75:25, followed by addition of 40% sulfuric acid (5.3 mol/l) to produce an electrode paste. This paste was coated over a collector 1' with a gasket 5 similar to the anode.

Each electrode was pressed at a pressure of 1370 pKa (14 kgf/cm²) to remove extra sulfuric acid. Thereafter, a separator 3, containing 40% sulfuric acid impregnated therein, was sandwiched between the anode material 2 and the cathode material 4 to produce a capacitor as shown in FIG. 1.

Poly(6-nitroindole), used for the anode material, was in a state that sulfuric acid ions were doped into it in the aqueous solution of 40% sulfuric acid, and the redox reaction accompanied with absorption and desorption of protons, corresponding to the reaction formula (2), proceeded at the region ② (about 900–1200 mV vs. Ag/AgCl) in FIG. 2. As for polyaniline of the cathode material, the redox reaction accompanied with doping and de-doping protons proceeded at the region (③ (about –200 to 500 mV vs. Ag/AgCl) in FIG. 5. Accordingly, for the capacitor, constant current charge and discharge tests were performed at 100 mA/cm² with an electromotive force of 1.3 V.

Figure 7:
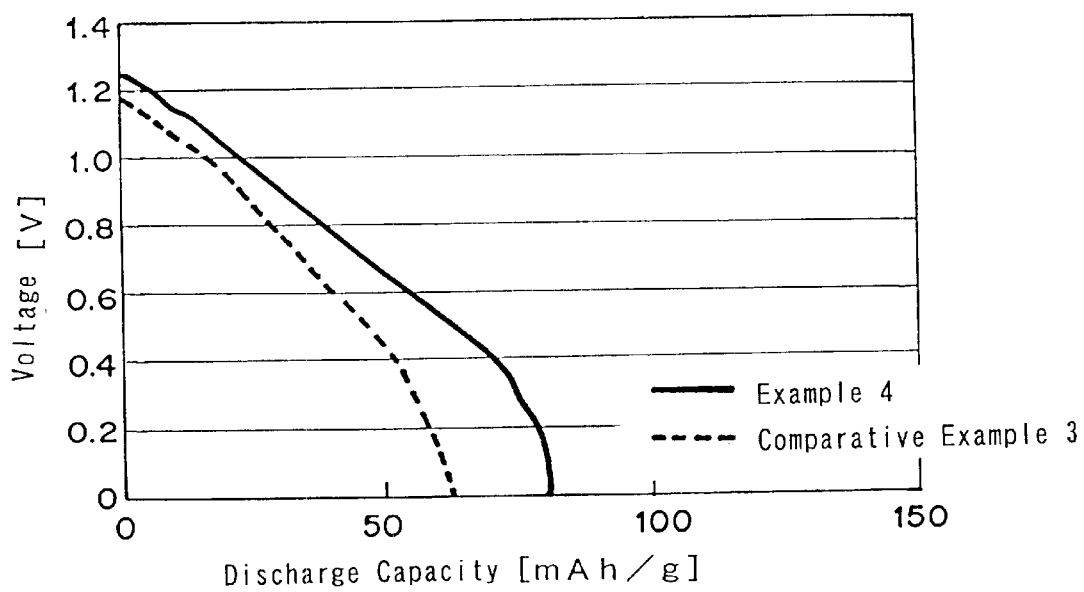
FIG. 7 shows discharge curves of capacitors according to Example 4 and Comparative Example 3.

The results from the capacitor are shown in Table 4, and the discharge curve is shown in FIG. 7. The reactions of the electrode materials used in this example had almost similar reactive potentials, and the discharge curve of the capacitor did not exhibit a flat part at the time of discharging.

The discharge capacity, obtained from the discharge starting voltage to 80% thereof, was 18 mAh/g. The total discharge capacity was 81 mAh/g. Table 4 shows a cyclic property, at a charge and discharge current density of 100 mA/cm², 25° C. and 60% discharge depth. In Example 4, the cycle number from the initial capacity to 80% thereof was 32,000.

The capacitor, although with a high voltage of 1.3 V, had an excellent cyclic property of 32,000 cycles.

Comparative Example 3

A capacitor was produced, using polyaniline as the anode material; polyaniline as the cathode material; and an aqueous solution of 40% sulfuric acid as the electrolytic solution. An electrode from the anode material and an electrode from the cathode material were produced through the same procedures as those of Examples 1 and 4.

In the capacitor, the reaction of polyaniline, used for the anode material, was the redox reaction accompanied with absorption and desorption of anions (region ④ in FIG. 5), and the reaction of polyaniline, used for the cathode material, was the redox reaction accompanied with absorption and desorption of protons (region ② in FIG. 5). Accordingly, for the battery with an electromotive force of 1.3 V, tests were performed in the same manner as that of Example 4.

The results from the capacitor are shown in Table 4, and the discharge curve is shown in FIG. 7. The reactions of the electrode materials used for this comparative example had almost similar reactive potentials, and the discharge curve of the capacitor did not exhibit a flat part at the time of discharging, similar to those of Example 4.

The discharge capacity, obtained from the discharge starting voltage to 80% thereof, was 11 mAh/g. The total discharge capacity was 62 mAh/g. Table 4 shows a cyclic property, at a charge and discharge current density of 100 mA/cm², 25° C. and 60% discharge depth. In Comparative Example 3, the cycle number from the initial capacity to 80% thereof was 85 cycles. The capacitor was very low in cyclic property.

In this comparative example, the reaction of doping and de-doping of anions of polyaniline, which had a slow reactive rate, was used in the anode. Therefore, the capacity was low and the cyclic property was low during rapid charging and discharging.

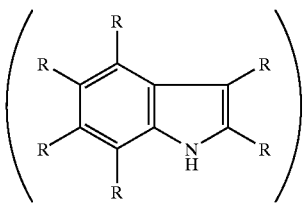

(1)

wherein at least two R groups are bonds which form a polymer and each of the other R groups denotes a hydrogen atom, a halogen atom, a hydroxyl group, a carboxyl group, a sulfonic group, a sulfuric acid group, a nitro group, an alkyl group, an aryl group, an alkoxyl group, an amino group, an alkylthio group or an arylthio group, which may be the same or different from each other, and at least one of said other R groups is a substituent other than a hydrogen atom.

2. The secondary battery according to claim 1, having an indole polymeric compound electrode containing 30–95% by weight of said indole polymeric compound.

3. The secondary battery according claim 1, having an aqueous or a nonaqueous solution of an electrolyte containing $10^{-3}$ mol/l to 18 mol/l of protons.

4. The secondary battery according to claim 1, having an aqueous or a nonaqueous solution of an electrolyte containing $10^{-1}$ mol/l to 7 mol/l of protons.

5. The secondary battery according to claim 2, having an aqueous or a nonaqueous solution of an electrolyte containing $10^{-1}$ mol/l to 18 mol/l of protons.

TABLE 4

| | Electrolytic solution | Dopant | Ions involved in reactions of anode | Voltage (V) | Capacity (mAh/g) | | Cyclic property (cycles) |
| | | | | | Down to 80% of starting voltage 100 mA/cm² | Total capacity 100 mA/cm² | |
|---|---|---|---|---|---|---|---|
| Example 4 | Aqueous solution | $SO_4^{2-}$ | $H^+$ | 1.3 | 18 | 81 | 32,000 |
| Comparative Example 3 | Aqueous solution | $SO_4^{2-}$ | $HSO_4^-$ or $SO_4^{2-}$ | 1.3 | 11 | 62 | 85 |

According to the present invention, an indole polymeric compound as an electrode active substance and protons as charge carriers of the polymeric compound are used to provide a secondary battery and capacitor having a high electromotive force together with a high cycle property and being capable of fast charging and discharging.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A secondary battery containing an indole polymeric compound as an electrode active material, said indole polymeric compound using a proton as a charge carrier and having a constituent represented by general formula (1):

6. The secondary battery according claim 2, having an aqueous or a nonaqueous solution of an electrolyte containing $10^{-1}$ mol/l to 7 mol/l of protons.

7. The secondary battery according to claim 3, wherein the aqueous or nonaqueous solution of an electrolyte contains an alkaline metallic salt, an alkaline earth metallic salt, an organic sulfonate, a sulfate, a nitrate or a perchlorate.

8. The secondary battery according to claim 1, wherein at least one R group denotes a hydroxyl group.

9. The secondary battery according to claim 1, wherein at least one R group denotes a halogen atom.

10. The secondary battery according to claim 1, wherein at least one R group denotes a carboxyl group.

11. The secondary battery according to claim 1, wherein at least one R group denotes a sulfonic group.

12. The secondary battery according to claim 1, wherein at least one R group denotes a sulfuric acid group.

13. The secondary battery according to claim 1, wherein at least one R group denotes a nitro group.

14. The secondary battery according to claim 1, wherein at least one R group denotes an alkyl group.

15. The secondary battery according to claim 1, wherein at least one R group denotes an aryl group.

16. The secondary battery according to claim 1, wherein at least one R group denotes an alkoxyl group.

17. The secondary battery according to claim 1, wherein at least one R group denotes an amino group.

18. The secondary battery according to claim 1, wherein at least one R group denotes an alkylthio group.

19. The secondary battery according to claim 1, wherein at least one R group denotes an arylthio group.

20. The secondary battery according to claim 1, having an indole polymeric compound electrode containing 60–90% by weight of said indole polymeric compound.

21. The secondary battery according to claim 1, further comprising a cathode comprising polyphenylquinoxaline which comprises a constituent represented by structural formula (3):

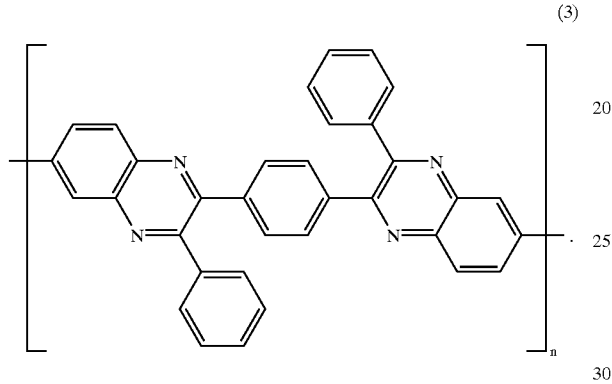

22. The secondary battery according to claim 21, wherein at least one R group denotes a hydroxyl group.

23. The secondary battery according to claim 21, wherein at least one R group denotes a halogen atom.

24. The secondary battery according to claim 21, wherein at least one R group denotes a carboxyl group.

25. The secondary battery according to claim 21, wherein at least one R group denotes a sulfonic group.

26. The secondary battery according to claim 21, wherein at least one R group denotes a sulfuric acid group.

27. The secondary battery according to claim 21, wherein at least one R group denotes a nitro group.

28. The secondary battery according to claim 21, wherein at least one R group denotes an alkyl group.

29. The secondary battery according to claim 21, wherein at least one R group denotes an aryl group.

30. The secondary battery according to claim 21, wherein at least one R group denotes an alkoxyl group.

31. The secondary battery according to claim 21, wherein at least one R group denotes an amino group.

32. The secondary battery according to claim 21, wherein at least one R group denotes an alkylthio group.

33. The secondary battery according to claim 21, wherein at least one R group denotes an arylthio group.

34. The secondary battery according to claim 22, wherein said anode comprises 60–90% by weight of said poly(6-nitroindole).

35. The secondary battery according to claim 27, wherein said anode comprises 60–90% by weight of said poly(5-cyanoindole).

36. A secondary battery comprising an anode comprising a poly(6-nitroindole) which comprises a constituent represented by structural formula (2):

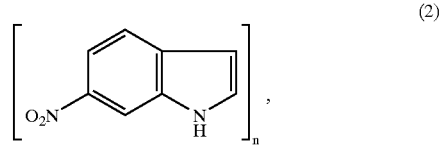

wherein at least two R groups are bonds which from a polymer and the other R groups denote hydrogen atoms;

a separator, an electrolytic solution of 40% sulfuric acid, and a cathode containing polyphenylquinoxaline which comprises a constituent represented by structural formula (3):

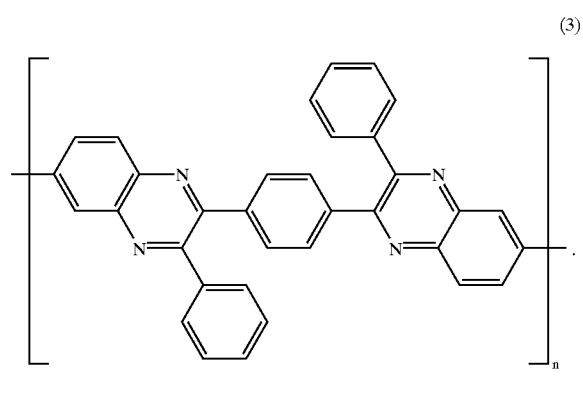

37. A secondary battery comprising an anode comprising a poly(5-cyanoindole) which comprises a constituent represented by structural formula (2'):

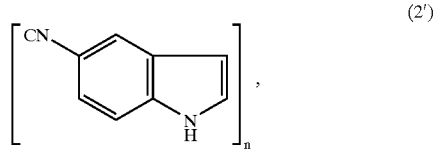

wherein at least two R groups are bonds which from a polymer and the other R groups denote hydrogen atoms;

a separator, an electrolytic solution of 40% sulfuric acid, and a cathode containing polyphenylquinoxaline which comprises a constituent represented by structural formula (3):

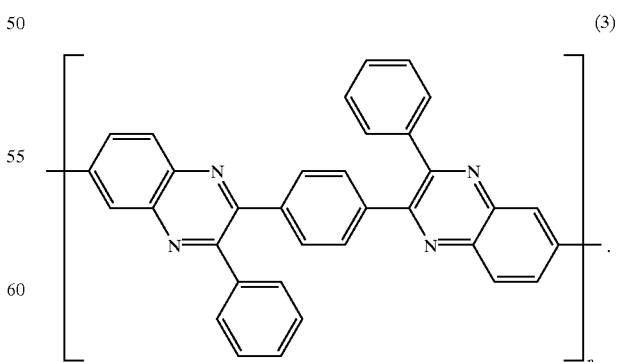

38. A secondary battery comprising an anode comprising a poly(6-nitroindole) which comprises a constituent represented by structural formula (2):

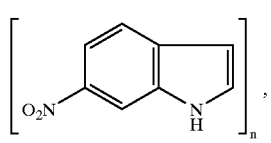 (2)
wherein at least two R groups are bonds which from a polymer and the other R groups denote hydrogen atoms;
a separator, an electrolytic solution of 1 mol/l of tetraethylammonium tetrafluoroborate and 0.1 mol/l of trifluoroacetic acid, and a cathode containing polyphenylquinoxaline which comprises a constituent represented by structural formula (3):
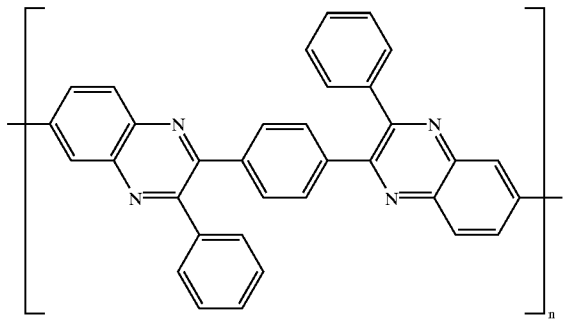 (3)
\* \* \* \* \*

UNITED STATES PATENT AND TRADEMARK OFFICE
CERTIFICATE OF CORRECTION

PATENT NO.     : 6,509,116 B1
DATED          : January 21, 2003
INVENTOR(S)    : Shinako Kaneko et al.

It is certified that error appears in the above-identified patent and that said Letters Patent is hereby corrected as shown below:

<u>Column 9,</u>
Line 8, delete "112,000" insert -- 12,000 --

Signed and Sealed this

First Day of July, 2003

JAMES E. ROGAN
*Director of the United States Patent and Trademark Office*